Jan. 11, 1938.     L. R. MARTIN     2,105,254
FILM GUIDE FOR FILM MAGAZINES
Filed Dec. 26, 1935
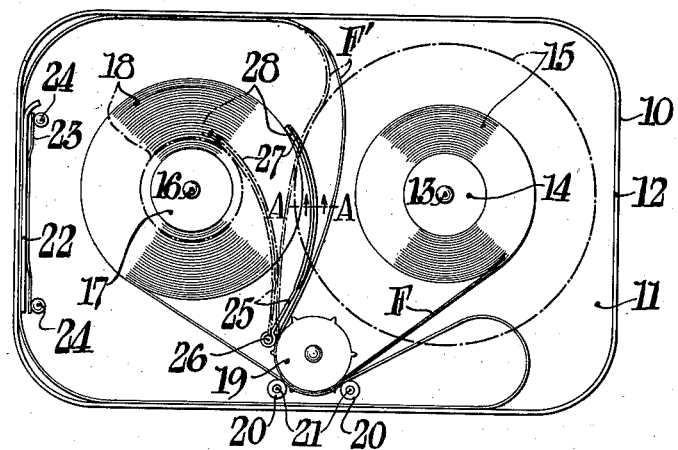
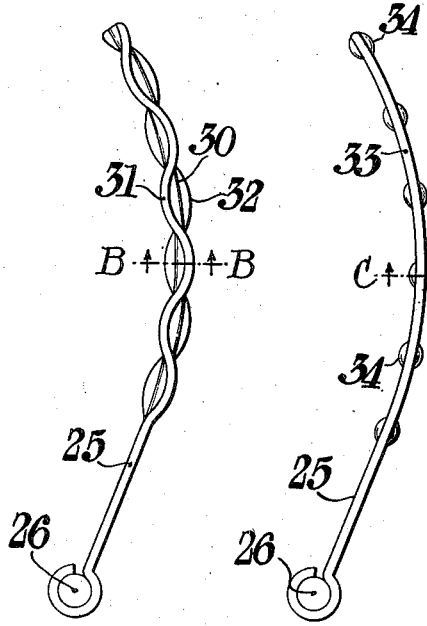
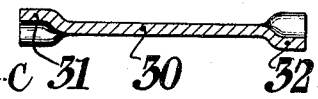
INVENTOR:
Lawrence R. Martin,
BY
George A. Gillette, Jr.
ATTORNEYS.

Patented Jan. 11, 1938

2,105,254

UNITED STATES PATENT OFFICE 2,105,254

FILM GUIDE FOR FILM MAGAZINES

Lawrence R. Martin, Rochester, N. Y., assignor, by mesne assignments, to Eastman Kodak Company, Jersey City, N. J., a corporation of New Jersey Application December 26, 1935, Serial No. 56,200

8 Claims. (Cl. 88—17)

The present invention relates to a guide means within a film magazine and more particularly to a guide member located between a portion of a preformed film loop and one of the film rolls within the magazine.

It is customary to locate and proportion the film rolls within a magazine so that the space initially occupied by one film roll is subsequently partially occupied by the other film roll. Such an arrangement contributes directly to a compact design for a double film magazine. For reliable operation of a film magazine it is also quite desirable to provide a preformed film loop within the magazine and through which loop the film is moved intermittently. Owing to the proximity of the film rolls in the aforementioned type of magazine there is considerable possibility of the film in the loop becoming prematurely wound upon one of the film rolls.

The primary object of the present invention is the provision in a film magazine containing a film roll and a preformed film loop of a guide member which is movably mounted between the film roll and the film loop to prevent premature winding of the film in the loop upon said film roll.

Another object of the invention is the provision of a guide member which has film guiding margins along each edge of the guide member and which margins may engage the perforated margins of the film strip to perform the aforementioned separating function without abrasion or scratching of the central portions or picture areas of the film strip.

Other objects of the invention will be suggester to those skilled in the art by the description which follows.

The aforementioned and other objects of the invention are attained by the provision in a film magazine containing a film roll and a preformed film loop of a movably mounted guide member which has offset margins for engaging the perforated margins of the film strip and for separating the film in the loop from the film roll so that the film cannot be prematurely wound upon the roll. The film engaging margins of the guide member may be provided in any of several different ways as will be subsequently explained.

Reference is hereby made to the accompanying drawing in which similar reference characters designate similar elements and in which:

Fig. 1 is a plan view of a film magazine containing a film roll and a preformed film loop and a guide member having film-engaging margins and movably mounted between the film in the film loop and the film roll.

Fig. 2 is a cross section through the preferred form of the guide member and taken on the line A—A of Fig. 1.

Fig. 3 is a side view of another form of the guide member which has sinuous film-engaging margins along each edge thereof.

Fig. 4 is a cross section through the guide member of Fig. 3 and taken on the line B—B of Fig. 3.

Fig. 5 is a side view of still another form of the guide member.

Fig. 6 is a cross section taken on the line C—C of Fig. 5.

The present invention is to be described with respect to a double film magazine containing a pair of film rolls and a preformed film loop because the advantages of the guide member are best understood in connection with a film magazine in which a portion of the space previously occupied by one film roll is subsequently occupied by the other film roll.

The film magazine may comprise a casing 10 having a side wall 11 and a lateral wall 12. A spindle 13 is mounted upon said side wall 11 and supports a film core 14 upon which the supply film roll 15 is wound. The original diameter of the supply film roll 15 is indicated by the dot-dash circle of Fig. 1. A second spindle 16 is also mounted upon said side wall 11 and supports a take-up film core 17 upon which is wound the take-up film roll 18. The original diameter of the take-up film roll 18 corresponding to the original diameter of the supply film roll 15 is also shown by a dot-dash circle.

A film moving means for maintaining a preformed film loop in the film is also mounted within the magazine and by way of example only is here disclosed as comprising a sprocket 19 mounted for rotation with respect to the side wall 11 and a pair of guide rolls 20 rotatably mounted adjacent the periphery of sprocket 19 upon a pair of posts 21 which are attached to side wall 11.

A film guideway in which the film is supported for exposure may comprise a presser pad 22 resiliently pressed against the front portion of lateral wall 12 by a spring member 23 which bears upon a pair of studs 24 on side wall 11.

The guide member of the present invention is advantageous when used in conjunction with the standard film path for a preformed loop within a film magazine but is particularly advantageous within a film magazine in which the film F passes from the film supply roll 15 around the film moving means, in a preformed film loop F' through the film guideway, and again over the film moving means to the take-up film roll 18. The original position of the film loop F' in a fully loaded film magazine is disclosed in dot-dash lines in Fig. 1 and may lie over the outer convolution of the full supply roll 15 indicated by a dot-dash circle. Under these conditions the first layer of film from the film moving means may become wound upon the take-up film roll 18 especially if the film magazine has been stored for any appreciable length of time so that the film has become set around the film moving means.

In order to prevent this premature winding of the film upon one of the film rolls, a guide member is movably mounted between the film loop F' and one of the film rolls. The guide member 25 is rotatably mounted upon a spindle 26 which is fastened to the side wall 11 of the magazine. Said guide member 25 may assume the position shown by the dot-dash lines of Fig. 1 when the magazine is fully loaded or may be rotated around spindle 26 as the diameter of the take-up film roll increases.

In any event said guide member 25 will prevent any of the film within the magazine or in the film loop F' from becoming prematurely wound upon take-up film roll 15. In performing this function the guide member 25 may be in contact simultaneously with the outer convolution of take-up film roll 18 and the film loop F' or may under some conditions be in contact with only one of these film portions. However, it is quite essential that some provision be made to prevent abrasion of the central portions or picture areas of either of these film strips and this object may be accomplished by various formations for the guide member 25.

In its preferred form the guide member 25 comprises a body portion 27 which is provided with film-engaging margins composed of offset portions 28 and 29 along each edge of said body portion 27. The portion 28 is offset in one direction from body portion 27 along one edge thereof while portion 29 is offset in the opposite direction along the other edge of body portion 27. Thus the offset portion 28 will engage only a single perforated margin of the outer convolution on the take-up film roll 18 while portion 29 will engage only the opposite row of perforations in the film loop F'. This form of the guide member 25 is preferred because it is simple in design and easy to manufacture.

Another form of the guide member 25 is illustrated in Figs. 3 and 4 and comprises a body portion 30 having a sinuous film-engaging margin 31 along one edge of said body portion 30 and a sinuous film-engaging margin 32 along the other edge of body portion 30. Said sinuous film-engaging margins 31 and 32 are shown as being out of phase principally to facilitate their illustration. The guide member including the sinuous margins 31 and 32 may engage both perforated margins either on the film on the take-up film roll 18 or in the film loop F', or may engage both of these film strips simultaneously and is mounted for movement similarly to the preferred form of guide member 25 upon the spindle 26.

Still another form of the guide member 25 is disclosed by Figs. 5 and 6 and includes a body portion 33 with a plurality of pimples 34 along each margin of said body portion 33. The pimples 34 are preferably provided in staggered relation as disclosed in Fig. 6 but may be provided in any other way that is deemed desirable. The guide member 25 which is provided with pimples 34 may also be mounted for movement within the film magazine around the spindle 26 and will function in the same manner as does the preferred form of the guide member 25.

All forms of the guide member 25 are shown with a longitudinal curvature but such curvature is not necessary to the principal purpose of the guide member although it does provide a more convenient form thereof.

Since many other forms of the guide member other than those disclosed are possible, such other forms as come within the appended claims are to be deemed to be within the scope of the present invention.

Having now particularly described my invention what I desire to secure by Letters Patent of the United States and what I claim is:

1. In a film magazine, the combination with a casing adapted to contain a supply film roll, a takeup film roll, and a film strip therebetween, mounting means for supporting said film rolls so that some of the space occupied by the supply film roll is subsequently occupied by the takeup film roll, and a film moving means for maintaining in said film strip a pre-formed film loop with a portion of said film strip between said film rolls, of a guide member mounted to move between said film loop and one of said film rolls and for preventing the film strip forming the film loop from being wound prematurely upon said one film roll.

2. In a film magazine, the combination with a casing adapted to contain a supply film roll, a takeup film roll, and a film strip therebetween, mounting means for supporting said film rolls so that some of the space occupied by the supply film roll is subsequently occupied by the takeup film roll, and a film moving means for maintaining in said film strip a pre-formed film loop which encircles one of said film rolls with a portion of said film strip between said film rolls, of a guide member mounted to move between said portion of the film loop and the takeup film roll and for preventing the film strip forming the film loop from being wound prematurely upon said takeup film roll.

3. In a film magazine, the combination with a casing adapted to contain a film roll and a film strip, and a film moving means for maintaining in said film strip a pre-formed film loop with a portion of said film strip adjacent to said film roll, of a guide member movably mounted between said film roll and said portion of the film strip and for preventing said portion of the film strip in the film loop from being wound prematurely upon said film roll, said guide member including film engaging margins on each face thereof and for engaging only the margin of the film in said portion and on said film roll.

4. In a film magazine, the combination with a casing adapted to contain a film roll and a film strip, and a film moving means for maintaining in said film strip a pre-formed film loop with a portion of said film strip adjacent to said film roll, of a guide member movably mounted between said film roll and said portion of the film strip and for preventing said portion of the film strip in the film loop from being wound prematurely upon said film roll, said guide member including a body portion and film engaging margins which are provided along opposite margins of said body portion and which are offset in opposite directions therefrom for engaging only the margins of the film roll and the film strip.

5. In a film magazine, the combination with a casing adapted to contain a film roll and a film strip, both of which are provided with marginal perforations, and a film moving means for maintaining in said film strip a pre-formed film loop a portion of which is adjacent to said film roll, of a guide member movably mounted between said film roll and said portion of the film loop and for preventing said portion of the film loop from being prematurely wound upon said film roll, said guide member including film engaging margins on opposite faces thereof and for engaging only the perforated margins of the film on said film roll and in said portion of the film loop.

6. In a film magazine, the combination with a casing adapted to contain a film roll and a film strip, and a film moving means for maintaining in said film strip a pre-formed film loop with a portion of said film strip adjacent to said film roll, of a guide member movably mounted between said film roll and said portion of the film strip and for preventing said portion of the film strip in the film loop from being wound prematurely upon said film roll, said guide member including a body portion and a film engaging margin along each edge of and offset in opposite directions from said body portion and for engaging only one margin of each film.

7. In a film magazine, the combination with a casing adapted to contain a film roll and a film strip both of which are provided with marginal perforations, and a film moving means for maintaining in said film strip a pre-formed film loop, a portion of which is adjacent to said film roll, of a guide member movably mounted between said film roll and said portion of the film loop and for preventing said portion of the film loop from being prematurely wound upon said film roll, said guide member including film engaging protuberances formed in opposite directions from and along the opposite edges of said body portion and for engaging only the perforated margins of the film roll and film strip.

8. A film guiding member adapted to be positioned between a pair of film strips having margins and a central portion, comprising a body portion, a film engaging flange off-set from one side and extending along one edge of said body portion to form therewith a guide for the margins only of one film, and a second film engaging flange off-set in the opposite direction from the other side and extending along the other edge of said body portion to form with the said other side thereof a guide for the margins only of the other film strip.

LAWRENCE R. MARTIN.